United States Patent [19]

Speer

[11] Patent Number: 5,012,646

[45] Date of Patent: May 7, 1991

[54] TURBINE ENGINE HAVING COMBUSTOR AIR PRECOOLER

[75] Inventor: Stephen R. Speer, Spokane, Wash.

[73] Assignee: Machen, Inc., Spokane, Wash.

[21] Appl. No.: 276,642

[22] Filed: Nov. 28, 1988

[51] Int. Cl.[5] .............................................. F02C 1/00
[52] U.S. Cl. .................................................... 60/728
[58] Field of Search ............ 60/728, 722, 736, 39.511, 60/262, 266, 267

[56] References Cited

U.S. PATENT DOCUMENTS

| | | | |
|---|---|---|---|
| 3,651,645 | 3/1972 | Grieb | 60/728 |
| 3,971,210 | 7/1976 | Rose | 60/728 |
| 4,081,958 | 4/1978 | Schelp | 60/728 |
| 4,137,705 | 2/1979 | Andersen et al. | 60/728 |
| 4,254,618 | 3/1981 | Elovic | 60/728 |
| 4,426,842 | 1/1984 | Collet | 60/39.511 |

Primary Examiner—Louis J. Casaregola
Assistant Examiner—Timothy S. Thorpe
Attorney, Agent, or Firm—Barry G. Magidoff

[57] ABSTRACT

The present invention provides means for significantly increasing the available power from an aircraft turbine engine, especially a turboprop or turboshaft engine. This is achieved by including a heat exchanger intermediate the compressor and the combuster; to significatnly reduce the temperature of the compressed gases fed to the combustor; the temperature drop ratio across the combustor air precooler must be greater than the pressure drop ratio across the precooler. This provides an increase in density of the air fed to the combustor with a resultant increase in mass flow through the combustor and the turbine, which increases available power, especially at higher altitudes. The aircraft turbine engine comprises a compressor to compress ambient air; a combustor in fluid flow connection with the compressor, for combusting compressed air and fuel; a heat exchanger means in intermediate fluid flow connection between the compressor and the combustor, to cool the compressed air; and a turbine in fluid flow connection with the combustor outlet, designed to be driven by the heated gases from the combustor.

19 Claims, 5 Drawing Sheets

TURBINE ENGINE HAVING COMBUSTOR AIR PRECOOLER

This invention relates to a turbine engine, especially an engine useful for fixed or rotary wing aircraft, or other vehicle, and more particularly to a means to maintaining maximum power output from a turbine engine of a given size with a variation in ambient conditions by precooling the air between the compressor and the combustor section.

Turbine engines have been used for over forty (40) years to power vehicles, especially aircraft, and are generally of several basic types, i.e., a turbojet engine, a turbofan engine and a turboshaft or turboprop engine. Generally, the turbojet and turbofan engines provide for a far higher air flow than are required for the turboprop or turboshaft engines, where the net power output drives a rotating airfoil, e.g., a propeller or helicopter rotor.

However, all three types have the same basic configuration, which comprises an ambient air inlet to a compressor where it is compressed and discharged at substantially higher pressure and temperatures The compressed air then passes through a combustor, where it is mixed with fuel and burned thereby further increasing the temperature and, by confining the volume, the resultant pressure for combustion gases. The hot combustion gases are then passed through the turbine section where mechanical shaft power is extracted resulting in the concomitant reduction of pressure and temperature. The remaining net pressure in the exhaust gases can be used to provide thrust if exhausted in rearward direction. Such thrust is of a more substantial amount in the turbojet and turbofan configurations than in the turboprop configuration.

A problem common to all of these aircraft-type turbine engine configurations is the temperature limitation on the structural material used in the turbine section. Unlike standing surface machines, e.g., stationary turbines for power generation, the density of the incoming air will vary more significantly during use, for example, as the aircraft ascends or descends in flight or as atmospheric temperature rises or falls. At the higher elevations, the air must be compressed more than the air at sea level to reach the necessary combustor operating pressures. This results in a substantial increase in the temperature of the air exhausted from the compressor, and fed into the combustor; which in turn results in a higher temperature for the combustion air fed into the turbine. Beyond a certain point this can reduce the structural integrity of the turbine to a point beyond which damage can result.

To meet this problem, aircraft engine designers have initially attempted to increase the strength of the materials used for the manufacture of turbines and to provide for cooling, especially for the interior of the turbine blades during operation. These systems, however, have substantially reached their limit with regard to cost. In general practice, the engines are held to below this maximum power, such that a larger, more powerful engine than would normally be required by the aircraft to sustain flight or to climb will be used; this is known as "flat rating". When an engine is "flat rated", it is operated at a greatly reduced output at sea level and the power output held relatively constant with increasing altitude. Although this approach allows such "flat" power rate to be maintained up to a higher altitude, until temperature and performance limits are exceeded, it also requires a larger, more costly engine and one which may operate significantly below its optimal design or output, thus also reducing fuel efficiency.

In accordance with the present invention, it has now been found that this problem can be met by providing a means of pre-cooling, or reducing the temperature of, the feed gases to the combustor, i.e., compressor discharge air, and thereby reducing the temperature of gases fed to the turbine to below the temperature limits of the turbine materials of construction; surprisingly it has also been found to be possible at the same time to supply more dense air to the combustor for combustion, resulting in a significant increase in available power. In accordance with this invention, a heat exchanger is provided intermediate the compressor and the combustor to significantly reduce the temperature of the compressor discharge air, fed to the combustor.

It is of especial importance in accordance with the present invention that the temperature drop ratio across the combustor air precooler be greater than the pressure drop ratio across the precooler. By this means there is a reinforcement or "bootstrap" effect: an increase in density of the air fed to the combustor with a resultant increase in air flow output provided from the compressor.

This bootstrap effect results in an air flow capacity increase which further increases available power at higher altitudes. In designing the precooler flow system, well known heat exchange calculations can be used to provide the necessary fluid flow efficiency simultaneously with providing the necessary heat exchange efficiency.

The air flow should be designed so as to be below the compressor choking value or rotational speed limits, but sufficiently above that otherwise obtainable in a conventional turbine engine of the same size.

It is recognized that this concept of pre-cooling combustor air is contrary to accepted engineering practice of maximizing thermodynamic cycle efficiency, whether, for example, in the Joule or Brayton cycles. Theoretical cycle efficiency is improved by increasing the turbine inlet temperatures, i.e., the temperature of the gas exhausting from the combustor chamber into the turbine. Indeed, many stationary gas turbine generators incorporate a heat-adding heat exchanger, or regenerator, at the compressor inlet. This increases the inlet air temperature entering the compressor, for the purpose of raising the overall cycle temperatures. Such "regeneration" is well known to improve efficiency. The present invention, does not contradict accepted thermodynamic principles, only its practice, in that an increase in power is obtained at the expense of a decrease in thermodynamic efficiency.

However, for aircraft applications where emphasis is on maximum available power, this decrease in thermodynamic efficiency can be acceptable.

In accordance with the present invention, an aircraft turbine system is provided comprising a compressor having an ambient air inlet means; outlet mean for compressed air from the compressor; a combustor in fluid flow connection with the compressed air outlet and having a fuel inlet and combustion inducing means and an outlet from the combustor for the burned gases; a heat exchanger means in intermediate fluid flow connection between the compressor outlet and combustor inlet to cool the compressed air; a turbine in fluid flow connection with the combustor outlet, the turbine having a blade exposed to the heated gases from the combustor and a power shaft in mechanical connection with the turbine blade for extracting mechanical energy from the turbine, and exhaust means for removing exhaust gases from the turbine.

In an alternate embodiment of the present invention, the exhaust outlet means from the compressor can be provided with a secondary flow valve and control means for controlling the secondary flow valve, to direct the flow of compressed gas to the heat exchanger or to bypass the heat exchanger and to pass directly to the combustor, in order to obtain a desired relation between combustor intake temperature and air flow pressure drop. The temperature of the compressed air flow can further be varied by monitoring and controlling the amount or the flow rate of the cooling side medium, whether it be air or a liquid or other gas passing through the cool side of the heat exchanger.

The heat exchanger can be of the indirect type and can provide for air-to-air heat exchange or air-to-liquid heat exchange. The air-to-liquid heat exchange must be provided with means for secondary cooling of the cooling liquid by ambient air. Alternatively, the cooling side of the heat exchanger can be open to ambient air, to cool the compressed gas.

In the accompanying drawings, examples of advantageous embodiments of the apparatus in accordance with the present invention are set forth. The apparatus is shown and described at times in schematic terms, essentially symbolically, as a result of the conventional nature of a major portion of the apparatus. Appropriate structural details for actual operation, where not explicitly set forth, are generally known and understood and need not be included in greater detail herein. They are not themselves part of the present invention. By eliminating the specific disclosure of such conventional apparatus, the scope and concept of the present invention will be emphasized and clarified. Reference is made to conventionally available elements by a generic description thereof and, if available, a reference to a specific example including a trade designation for a presently available device from a United States manufacturer. Specifically, the details of aircraft type turbine engines are well known to the art and the engine itself is thus not specifically described.

REFERRING TO THE DRAWINGS

Figure 1:
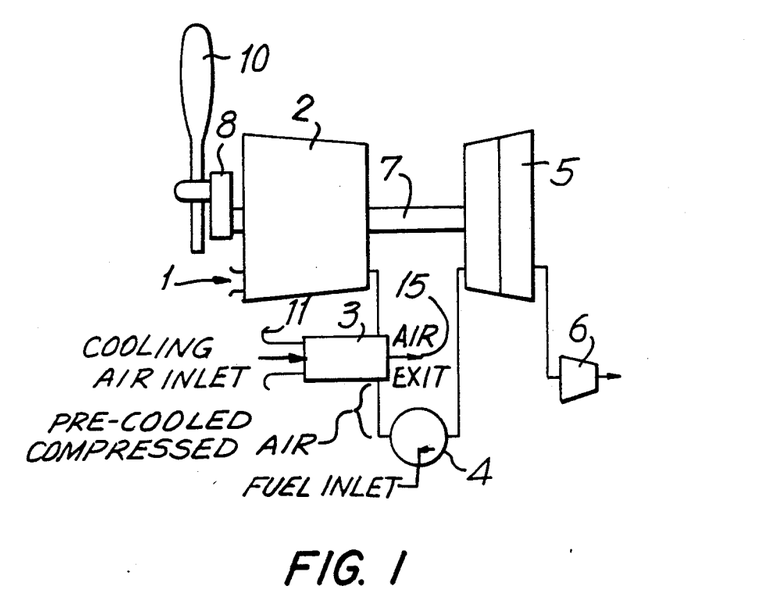
FIG. 1 is a schematic diagram of an aircraft turboshaft engine, including the combustor air pre-cooling heat exchanger of the present invention.

A simple schematic of the present invention is shown in FIG. 1 for a turboprop type engine The engine air enters the compressor inlet 1, is compressed in the compressor 2, and is passed to a combustion air pre-cooling heat exchanger 3 where the compressed air is cooled. The cooled air is then passed into the combustor chamber 4 where it is mixed with fuel and ignited, to form hot combustion gases. The hot combustion gases then pass to the turbine where the turbine blades are spun by the action of the gases and power is extracted via the shaft 7, and the reduced pressure gases are then exhausted through the nozzle or exhaust duct 6. As shown, the shaft powers the compressor and in addition, through a reduction gear 8, powers the propeller 10. In this most simple design, the hot compressed gases from the compressor 2 are cooled in the pre-cooling heat exchanger 3 by ambient temperature air drawn in through a cooling air inlet 11, as the aircraft is moving.

Figure 2:
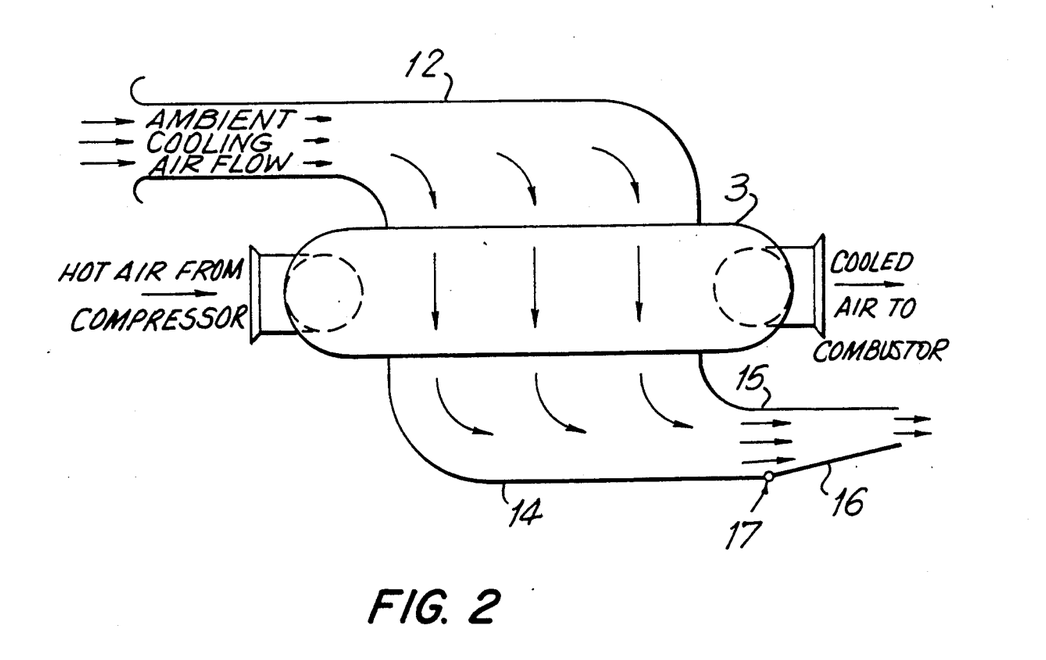
FIG. 2 is a schematic side view showing the ambient cooling air flow path of the heat exchanger of FIG. 1.

Referring to FIG. 2, the cooling medium (cold side) flow path of the heat exchanger is shown wherein the cooling air inlet 11 is preferably located rearwardly of and adjacent to the propeller or rotors (on a fan jet type engine), such that the air velocity of the ambient air entering the cold side of the heat exchanger is greater than would be obtained merely by the movement of the aircraft through the air. The ambient cooling air passes through the inlet 11 and into the inlet duct manifold 12 and then to the heat exchanger unit 3 where it passes, for example, perpendicularly to the flow of the hot compressed air and absorbs the heat therefrom. The cooling air is then exhausted through exit duct manifold 14 and out the exhaust opening 15. The cooling air flow entering the inlet 11 can be controlled as by providing for a variable area exit opening 15 controlled by a flap 16 operated about a pivot 17. The flap can be manually or automatically controlled by known means to vary the cooling air flow, and thus the temperature of the cooled compressed air exiting from the heat exchanger 3 to the combustor 4.

Figure 3:
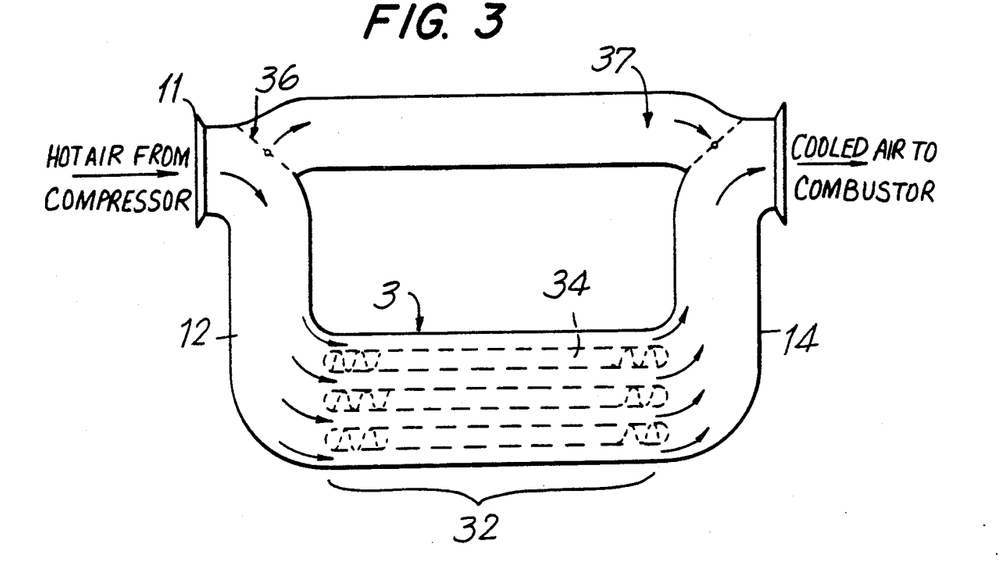
FIG. 3 is a schematic cross-sectional side view of a combustor air precooling heat exchanger including a bypass provision.

As a further alternative, and to provide means to control temperature drop as well as for reducing the compressed air flow pressure loss across the heat exchanger, there is provided, as shown in FIG. 3, a secondary flow duct 37 connected in parallel with the heat exchanger 3, between the inlet manifold 12 and outlet manifold 14, so as to direct at least a portion of the compressed air directly from the compressor 2 to the combustor 4. A secondary flow valve, such as the butterfly valve 36, can be adjusted to provide a mixture of cooled and non-cooled compressed air flow from the compressor 2 to the combustor 4, to obtain the desired relationship between combustor intake temperature and compressed air flow pressure drop. In addition, at lower altitudes and ambient temperatures, or while taking off or landing, the heat exchanger can be completely bypassed.

The secondary flow valve can be manually adjustable or can be adjusted automatically by means responsive to the pressure drop between the compressor outlet and the combustor inlet and the temperature drop between the same two points.

Figure 10:
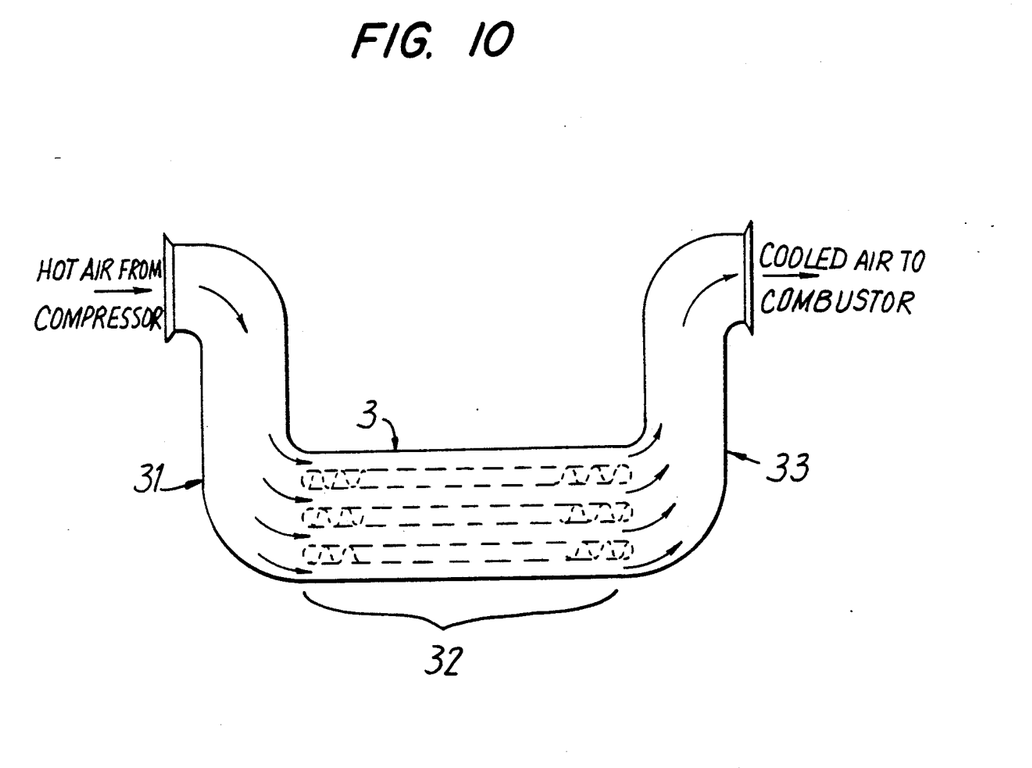
FIG. 10 is a cross-sectional side view of a heat exchanger suitable for use in the engine of FIG. 7.

The heat exchanger core 33, is schematically shown as a plate-fin type heat exchanger in the partial sectional view of FIG. 10. Other types of heat exchangers can be used, provided that the necessary heat transfer and fluid flow efficiency can be obtained, such as tube type and plate type heat exchangers. As shown, the heat exchanger core 33 provides cooling air flowing perpendicular to the compressor discharge air flow to be cooled, and includes the corrugated, or fin, members 132 to divide each flow stream into separate flow passages, and plates 133 to separate the two streams. The compressor discharge air passes through hot side flow passages separated by other corrugated members, (extending perpendicularly of those shown in the cooling air passages), between the inlet manifold duct 12 and the outlet manifold duct 14.

As is explained herein, the incorporation of the combustor air pre-cooling heat exchanger of the present invention into an aircraft turbine engine requires the careful matching of the heat exchanger characteristics with the design and requirements of the engine. One group of existing engines which readily lend themselves to retrofitting to accommodate a combustor air pre-cooler in accordance with the present invention, are the engines manufactured by the Allison Division of General Motors Corp., bearing the designation Model T-63 for military applications and Model 250 series for commercial applications. Unlike certain other turboprop engines, the combustor, compressor and turbine are not provided in an inline configuration, with the compressor at the front and the turbine at the rear. Rather, in the Allison engines, the engine air from the forward compressor is channeled through external compressed air ducts on each side of the engine to a combustor located at the rear of the engine; the exhaust gases from the combustor then pass into a turbine stage located intermediate the combustor and the compressor. Such a design is schematically shown in FIG. 4a, wherein the compressor section is located towards the forward portion of the engine and the compressed air is discharged through a pair of compressor discharge air ducts extending to the rear of the engine unit where the combustor chamber is located. The hot combustion gases from the combustor are discharged forwardly to a turbine in an intermediate location.

Figure 4:
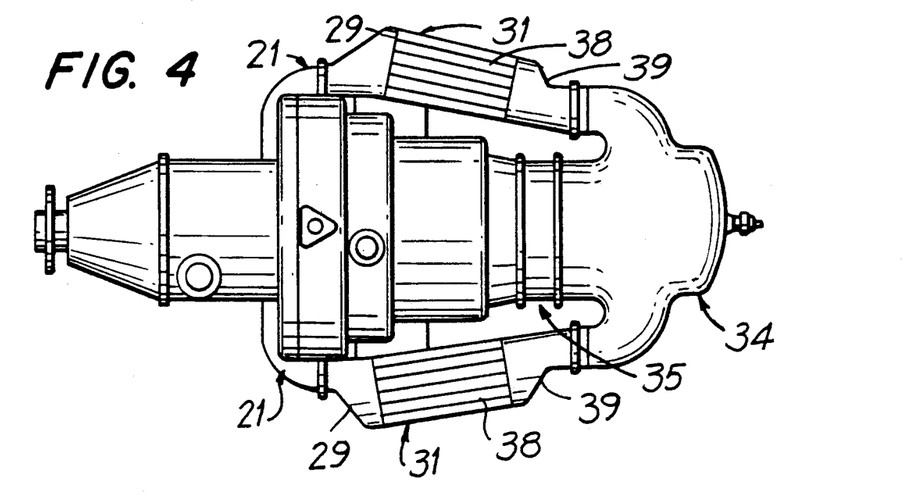
FIG. 4 is a top view of a modified commercially available turboprop engine including the combustor precoolers of the present invention.
Figure 4A:
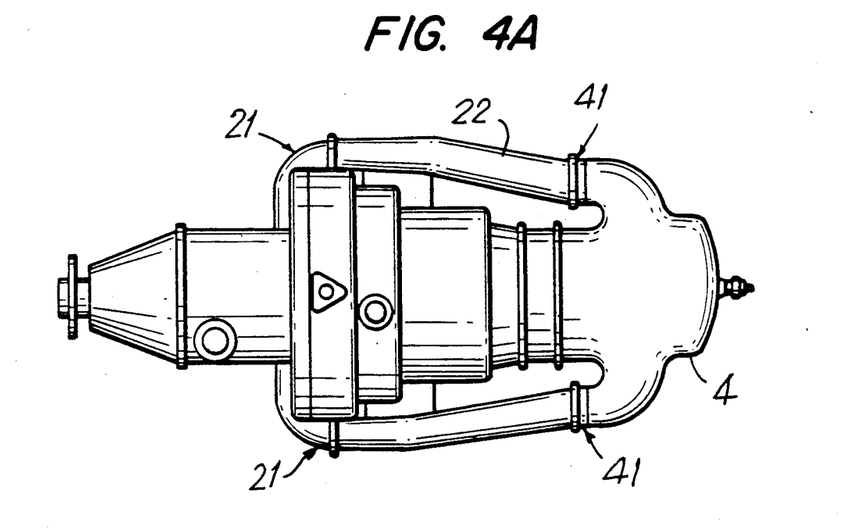
FIG. 4a is a top view of the commercially available Allison turboprop engine.
Figure 5:
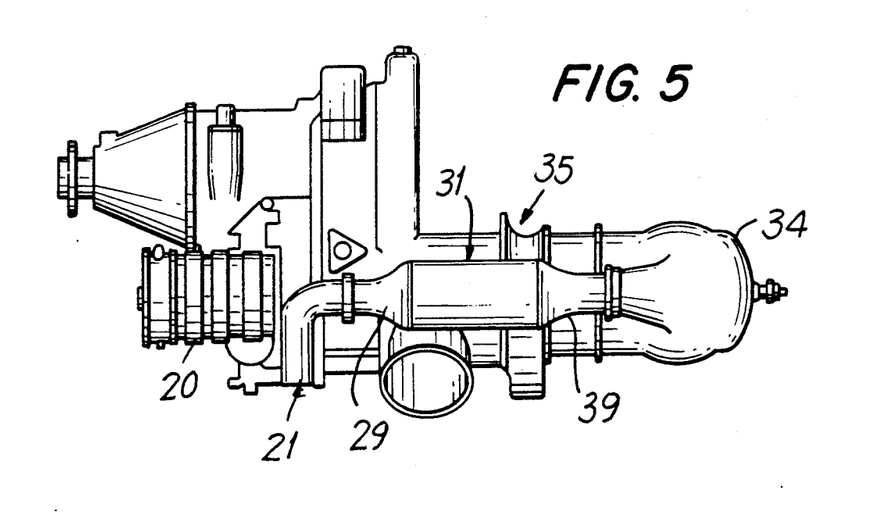
FIG. 5 is a side view of the modified engine of FIG. 4.
Figure 6:
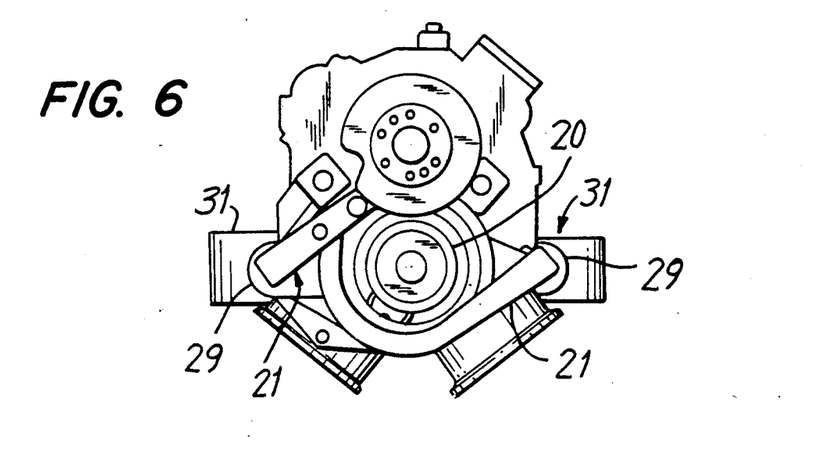
FIG. 6 is a front view of the engine of FIG. 4.

As shown in FIGS. 4-6, the discharge air ducts can be readily replaced by a pair of combustor air pre-cooling heat exchangers, generally indicated by the numeral 31, which can be of the air cooled variety, for example of the type shown in FIG. 10 above, or can be a liquid cooled heat exchanger. Referring to FIGS. 4-6, air is drawn into the compressor stage 20, where it is compressed and then discharged through a pair of compressor outlets 21 and then into a pair of heat exchanger manifolds 29 on either side of the compressor 20. The manifolds 29 feed the compressed air into and through heat exchanger cores 38 within the heat exchanger units 31. The cooled compressed air then passes from the heat exchanger core 38 into the heat exchanger outlet duct manifolds 39 and then into the combustor 34. The hot combustion gases from the combustor 34 are then passed to the turbine stages generally indicated by the numeral 35. It is thus clearly seen why the Allison engine can be readily modified by merely replacing the pair of external compressor air discharge ducts with a pair of combustor pre-cooling heat exchangers without unduly changing the air flow path of the conventional system. Presently available such commercial engines are used in both the turboprop aircraft configuration and turboshaft helicopter configurations.

Although as shown, the combustor pre-cooling heat exchangers 31 in FIG. 4 are substantially larger than the compressor discharge ducts shown in comparative FIG. 4a for the conventional Allison model 250 turboprop engine, it is preferred to minimize the increase in size in order to avoid significantly increasing the front cross-sectional area of the engine. Thus, in an alternate embodiment of this modified Allison engine, air-to-liquid heat exchangers can be provided Referring to FIGS. 7-9, the heat exchangers, generally indicated by the numeral 50, are shown as counter-current liquid-cooled devices wherein the hot compressed air flow is cooled by a re-circulated liquid coolant. The pair of air-liquid heat exchangers 50 are substituted for the compressed air-flow ducts intermediate the compressor 20 and the combustor 34. It must be noted that in FIGS. 4-9, except for the heat exchangers 50 provided, the engine is substantially in accordance with the commercially available Allison 250 engine.

Figure 7:
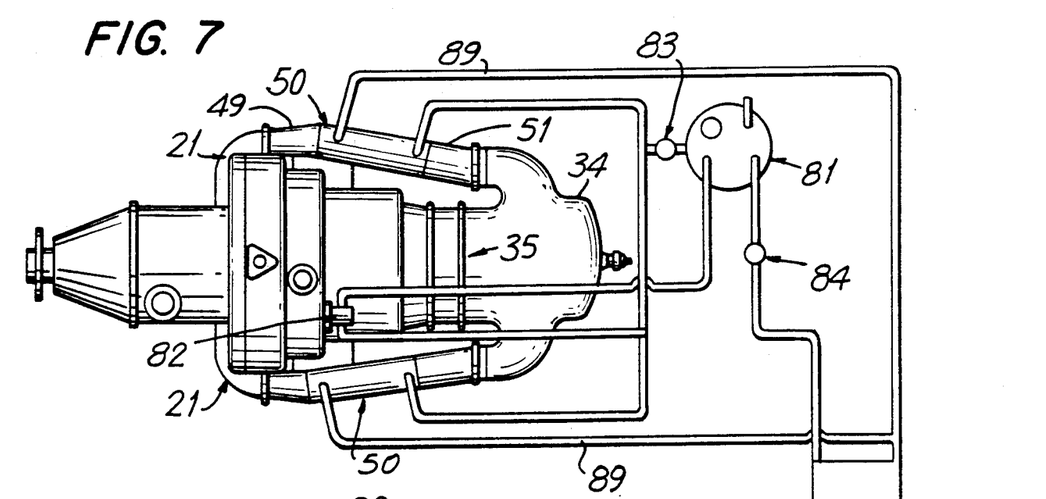
FIG. 7 is a top view of a liquid cooled modified turboprop engine in accordance with the present invention.
Figure 8:
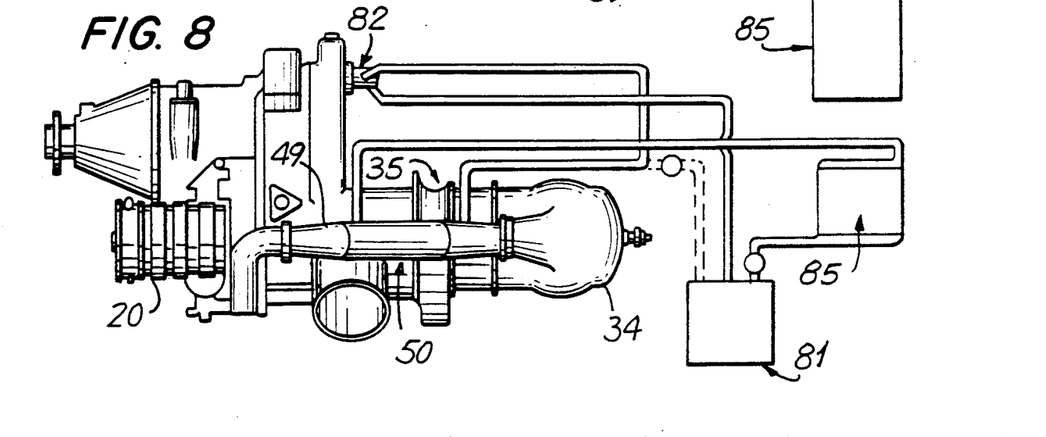
FIG. 8 is a side view of the engine system of FIG. 7.
Figure 9:
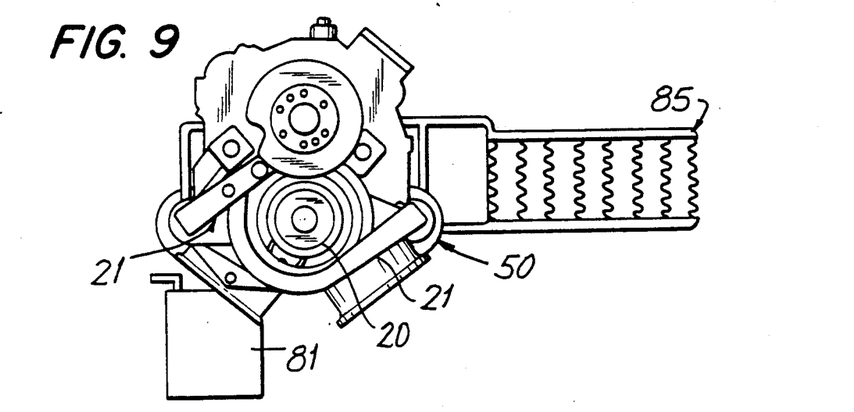
FIG. 9 is a front view of the engine system of FIG. 7.

Liquid is fed to tubes 51 in the cooling cores of the compressed air heat exchangers 50 from liquid pump 82, which in turn draws liquid from a reservoir 81. The compressed air is fed into the shell side of the heat exchanger 50. The heated cooling liquid exiting from the heat exchangers 50 passes through liquid flow lines 89 to a remotely mounted heat exchanger 85. The hot cooling liquid is cooled by ambient air in the conventional, cross-flow heat exchanger 85, and then flows back into the reservoir 81.

Most preferably, a pressure relief valve 83 is located intermediate the reservoir 81 and the liquid inlet to the heat exchanger core, and a thermostat 84 is positioned in the common flow lines between the reservoir 81 and the liquid cooling heat exchanger 85.

The pump 82, preferably positioned between the reservoir 81 and the pair of heat exchanger inlets 50, can be driven in accordance with conventional means by the auxiliary gear box of the turbine engine or by means of an auxiliary electrical or hydraulic motor.

Although apparently the liquid cooled combustor air heat exchanger appears to be mechanically more complex, it can provide more nearly optimum efficiency from this type of device. The liquid cooled combustor pre-cooler is more readily regulated with respect to the temperature gradient of the compressed air. Further, as stated above, the engine heat exchangers themselves can be of smaller overall size and in addition can be more readily scaled to result in a lower flow pressure loss for the compressed air across the heat exchanger, compared to an equivalent heat transfer capability in an air-to-air type heat exchanger.

For example, the temperature drop across the combustor pre-coolers can be varied by regulating the cooling liquid flow rate or by varying the ambient cooling air flow rate in the auxiliary liquid heat exchanger 85. Further, the ambient air liquid cooler can be located substantially anywhere on the aircraft, so as to permit utilization of the extracted heat from the liquid. For example, thin plate heat exchangers can be located on the leading edges of the wings to provide for the circulation of the heated cooling liquid to de-ice the wings Other aerodynamic surfaces can also be de-iced, for example, tail or elevator surfaces as well as engine air inlets and the cabin windshield Similarly the heated liquid can be used to power a heat pump for conditioning the temperature of the cabin interior, as by heating or cooling. Finally, the heated liquid can be used as an energy source for an auxiliary power unit.

In a most preferred embodiment of this invention, the combustor air pre-cooler heat exchangers are so sized and designed as to provide for the compressed air temperature drop ratio to be larger than the compressed air flow pressure drop ratio. Specifically, the ratio $T_1/T_2$, wherein $T_2$ is the temperature of the air leaving the heat exchanger and directed to the combustor, and $T_1$ is the temperature of the compressed air from the compressor into the heat exchanger inlet, is greater than the ratio $P_1/P_2$, wherein $P_2$ is the pressure of the compressed air flowing into the combustor from the heat exchanger and $P_1$ is the pressure of the compressed air leaving the compressor and immediately before entering the heat exchanger.

This advantage in the pressure ratio over the temperature ratio provides the desirable boot strapping effect for the present invention. In cooling the compressed air, proportionately to a greater extent than the pressure reduction caused by the flow through the heat exchanger, the air entering the combustor is made more dense The higher density air, increases mass flow rate through the engine, and in combusting fuel in the combustor, will yield greater energy to and power from the turbine section, which in turn will provide increased air flow output from the compressor. It is generally found that turbine engines which require a greater air consumption, specifically the turbojet and turbofan designs, are not as effectively enhanced by this combustor pre-cooling invention, as are the turboshaft and turboprop configurations, wherein the air flow is somewhat lower. Thus, with a lower air flow it is simpler to maintain a low pressure drop across the heat exchanger pre-cooler without increasing the heat exchanger cross-sectional area to an undesirable extent.

In the typical turboprop or turboshaft engine, for example the Allison 250 series, two-thirds of the total power output from the turbine section is utilized to operate the compressor section of the engine Consequently, for a turboprop engine providing an output of 600 shaft horsepower, the total output of the turbine was actually 1800 horsepower, and about 1200 horsepower was utilized to operate the compressor. Consequently, any factors which affect the operation of the compressor will have a significant effect on engine power output.

The efficient operation of a gas turbine requires that most of the increase in air flow internal and potential energies (provided by the compressor), be available to provide work output in the turbine section. Significant loss of energy prior to the turbine section, for example by flow losses in the heat exchanger, result in a corresponding reduction in available shaft power. However, by maintaining the ratio of $T_1/T_2$ greater than $P_1/P_2$, and by matching the combustor temperature to the temperature of maximum burning efficiency for the fuel, by careful fluid flow and heat transfer design of the heat exchanger, undesirable power reduction can be avoided and the enhancing effect of this invention maintained and magnified. It has further been found that some of the heat energy transferred to the cooling medium can be recovered as a consequence of a reduction in boundary layer drag to the aircraft in the region of the heat exchanger cooling air exit.

Engineering procedures for designing heat exchangers suitable for this application are well known and are presented, for example in *Principles of Heat Transfer*, by Frank Kreith, International Textbook Company, 1965. An example of an air-to-air plate fin heat exchanger, core for use on an Allison Model 250 turboshaft engine, is as follows:

A. Compressor discharge air flow (A in FIGS. 3 & 10) Data for each heat exchanger.

Air mass flow rate. 2 lb/sec.
Maximum compressor discharge temperature (engine design parameter): 750° F.
Maximum compressor discharge pressure: 110 psia B. Ambient cooling air flow (B in FIG. 2) Data, at sea level for each heat exchange.

Air mass flow rate (per heat exchanger): 1 lb/sec.
Air ambient temperature: 120° F.
Air ambient inlet pressure. 14.7 psia.

C. Heat Exchanger Design Geometry.

Exterior core dimensions: 10 in. × 7 in. × 7.3 in.
Material: stainless steel
Plate thickness: .016 in.

(i) Compressor discharge air (hot) flow side.

Face dimensions: 7 in. × 7.3 in.
Flow length: 10 in.
Number of Fin Rows: 11
Fin spacing: 16 fins/in.
Fin sheet thickness: .010 in.

(ii) Cooling air (cold) flow side.

Face Dimensions. 10 in. × 7.3 in.
Flow Length: 7 in.
Number of Fin rows: 12
Fin spacing: 10 fins/in.
Fin sheet thickness: 0.010 in.

D. Heat exchanger performance.

(i) Compressor discharge air (hot) flow side.

Effectiveness: 0.25
Air flow exit temperature: 580° F.
Air flow pressure differential: 0.8 psid (ii) Ambient Air (cold) flow.

Ambient air flow exit temperature: 454° F.
Ambient air flow pressure differential: 0.28 psid.

It is advisable that the air flow ducting, heat exchanger manifold and heat exchanger core, must all be designed and properly matched (in accordance with general heat exchanger design parameters) with the air flow and temperature reduction requirements for each specific engine, to obtain maximum effectiveness.

Overall, the boot strapping effect can generate an increase in air flow capacity and thus results in an increase of available power at higher altitudes, as compared to a turbine engine which does not incorporate the combustor air pre-cooler invention. The boot strapping effect can be explained by pointing out that the increased density of the cooled compressor discharge air in the constant volume operation of the turbine results in an effective increase in mass flow rate through the engine, and thus a significant increase in power output.

What is claimed is are as follows:

1. In a turbine engine designed for use on aircraft, the turbine engine comprising a compressor having an inlet for ambient air and having an outlet for compressed air; a combustor to burn compressed air and fuel and having an air intake in fluid flow connection with the outlet of the compressor and an exhaust for hot combustion gases, and a turbine in fluid flow connection with the exhaust from the combustor and having mechanical power output means in operative connection with the compressor; the improvement comprising: a combustor air pre-cooler heat exchanger means having a hot compressed air inlet and a cooled compressed air outlet, first fluid flow connection means between the compressor and the compressed air inlet, and second fluid flow connection means between the cooled compressed air outlet and the combustor, the second fluid flow connection means being free of means to increase fluid pressure, the precooler being designed to cool the compressed air from the compressor outlet, such that the temperature of the cooled compressed air entering the combustor is reduced such that the temperature drop ratio between the compressor outlet and the combustor air intake is greater than the pressure drop ratio between those two locations.

2. The turbine engine of claim 1, wherein the precooler heat exchanger means comprises intake means for the cooling fluid; a plurality of heat exchange surfaces, the surfaces defining flow channels for the compressed air from the compressor and for a cooling fluid, the heat exchange surfaces separating the compressed air and the cooling fluid and providing for indirect heat exchange therebetween; discharge means from the heat exchanger for the heated cooling fluid, and exit means for conducting the cooled compressed air to the combustor.

3. The turbine engine of claim 2, wherein the cooling fluid flows counter-currently to the flow of the compressed air through the heat exchanger.

4. The turbine engine of claim 2, wherein the cooling fluid flows transversely with respect to the direction of flow of the compressed air through the heat exchanger.

5. The turbine engine of claim 2, wherein the heat exchanger means comprises two separated heat exchanger units, the two heat exchanger units being in parallel fluid flow connection between the compressor and the combustor.

6. The turbine engine of claim 2, further comprising bypass flow conduit means in parallel fluid flow relation to the heat exchanger means and interconnecting the compressor and the combustor.

7. The turbine engine of claim 6, further comprising bypass valve control means for opening and closing the bypass conduit means to flow of compressed air from the compressor.

8. The turbine engine of claim 7, wherein the bypass control means comprises valve means to alternatively open and close the bypass duct and the heat exchanger inlet to flow from the compressor.

9. The turbine engine of claim 2, wherein the heat exchanger means comprises in addition a liquid coolant flow system including a coolant inlet means designed to place a liquid coolant in flowing indirect heat exchange relationship with the compressed air in the heat exchanger.

10. The turbine engine of claim 9, wherein the liquid coolant flows counter-currently to the flow of compressed air through the heat exchanger.

11. The turbine engine of claim 9, wherein the liquid flow system further compresses a liquid coolant recooling means comprising a liquid coolant reservoir, a liquid coolant recooling means in fluid flow relationship with the reservoir and the heat exchanger, and liquid coolant pumping means for creating fluid flow within the liquid coolant flow system.

12. The turbine engine of claim 11, wherein the liquid coolant recooling means comprises a second heat exchanger means comprising a plurality of heat exchange surfaces, the surfaces defining flow channels for the liquid coolant adjacent to a flow of ambient air, so as to separate the ambient air from the liquid coolant and to provide for indirect heat exchange therebetween.

13. The turbine engine of claim 12, wherein the ambient air and the liquid coolant are each confined in flow channels within the second heat exchanger.

14. The turbine engine of claim 13, wherein the directions of flow through the second heat exchanger of ambient air and of the liquid coolant are in transverse relationship.

15. The turbine engine of claim 13, wherein the second heat exchanger is at a location on the aircraft distal from the turbine engine.

16. The turbine engine of claim 2, wherein the coolant fluid is ambient air, and the cooling fluid inlet faces in a forward direction, in the direction of flight of the aircraft.

17. The turbine engine of claim 2, wherein the precooler heat exchange means comprises a plate fin heat exchanger.

18. The turbine engine of claim 2, wherein, the mechanical power output means comprises a rotatable shaft designed to be operably connected to and to drive a rotating airfoil.

19. A powered aircraft comprising a fuselage and airfoil surface and a rotating airfoil, the rotating airfoil being secured to the aircraft by a rotatable shaft, and a turbine engine, operably secured to the rotatable shaft for driving the rotatable shaft, the turbine engine comprising a compressor having an inlet for ambient air and having an outlet for compressed air; a combustor to burn compressed air and fuel and having an air intake in fluid flow connection with the outlet of the compressor and an exhaust for hot combustion gases, and a turbine in fluid flow connection with the exhaust from the combustor and having mechanical power output means in operative connection with the compressor; the improvement comprising: a combustor air pre-cooler heat exchanger means having a hot compressed air inlet and a cooled compressed air outlet, first fluid flow connection means between the compressor and the compressed air inlet, and second fluid flow connection means between the cooled compressed air outlet and the combustor, the second fluid flow connection means being free of means to increase fluid pressure, the precooler being designed to cool the compressed air from the compressor outlet, such that the temperature of the cooled compressed air entering the combustor is reduced.

* * * * *